United States Patent [19]
Schade

[11] Patent Number: 5,950,571
[45] Date of Patent: Sep. 14, 1999

[54] WATER RESISTANT LIGHTED LEASH AND COLLAR

[76] Inventor: Doc L. Schade, P.O. Box 141, Oroville, Calif. 95965

[21] Appl. No.: 09/027,878

[22] Filed: Feb. 23, 1998

[51] Int. Cl.$^6$ .................................................. A01K 27/00
[52] U.S. Cl. ........................................ 119/859; 119/908
[58] Field of Search .................... 119/859, 858, 119/712, 720, 719, 908; 362/103, 108; 600/384, 386, 388, 389, 390; 2/905

[56] References Cited

U.S. PATENT DOCUMENTS

| | | | |
|---|---|---|---|
| 3,944,803 | 3/1976 | Chao | 240/6.4 W |
| 4,108,341 | 8/1978 | Pettinger | 224/5 H |
| 4,173,201 | 11/1979 | Chao et al. | 119/106 |
| 4,513,692 | 4/1985 | Kuhnsman et al. | 119/109 |
| 4,523,258 | 6/1985 | Morse et al. | 362/108 |
| 4,539,937 | 9/1985 | Workman | 119/29 |
| 4,652,981 | 3/1987 | Glynn | 362/103 |
| 4,812,953 | 3/1989 | Ask et al. | 362/103 |
| 4,887,552 | 12/1989 | Hayden | 119/109 |
| 4,909,189 | 3/1990 | Minotti | 119/106 |
| 5,370,082 | 12/1994 | Wade | 119/859 |
| 5,535,106 | 7/1996 | Tangen | 362/108 |
| 5,630,382 | 5/1997 | Barbera et al. | 119/859 |
| 5,722,757 | 3/1998 | Chien | 362/32 |

*Primary Examiner*—Jack W. Lavinder
*Assistant Examiner*—Yvonne Abbott
*Attorney, Agent, or Firm*—Mark C. Jacobs

[57] ABSTRACT

An illuminable dog, cat or other tethered animal leash and animal collar which contains a series of lights, such as but not limited to light emitting diodes, which series is externally mounted of the collar or leash, with spacing between each member thereof. The lights are electrically connected to wiring that is disposed within a recess(es) of the substrates used for the device. The wiring may be covered by an extra insulator and a sealant may be employed to close the gap along the junction of the two layers that are joined together with the wiring inside thereof. The mode of construction for both the leash and collar are the same. The series of lights may all be the same or a pair of colored lights or even multi-colored ones may be employed. These lights may be manually actuated or turned on via a daylight sensor. The bulbs may run constantly, though blinking is preferred, to limit heat buildup and enhance visibility.

17 Claims, 3 Drawing Sheets

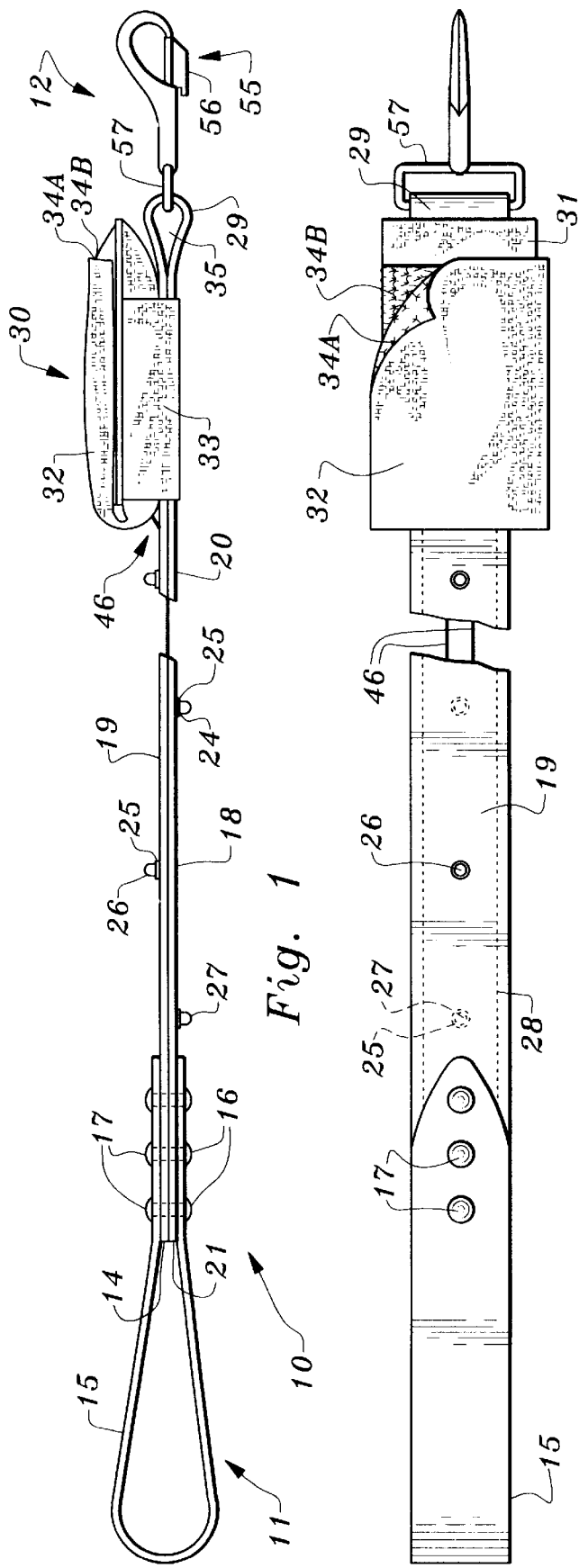
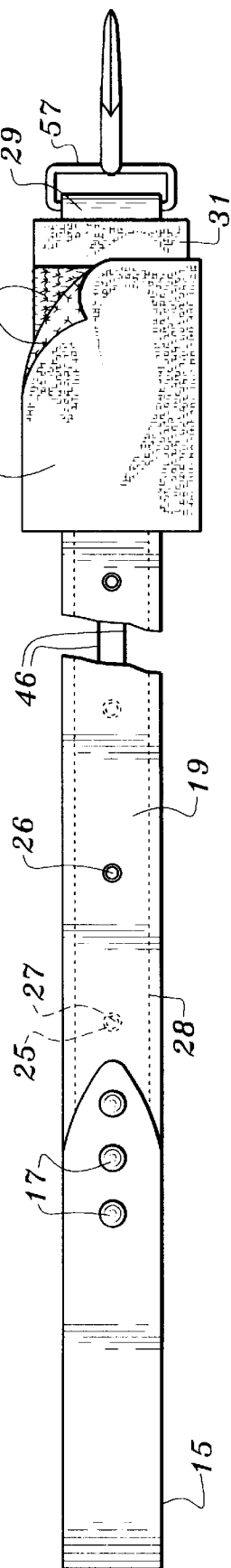
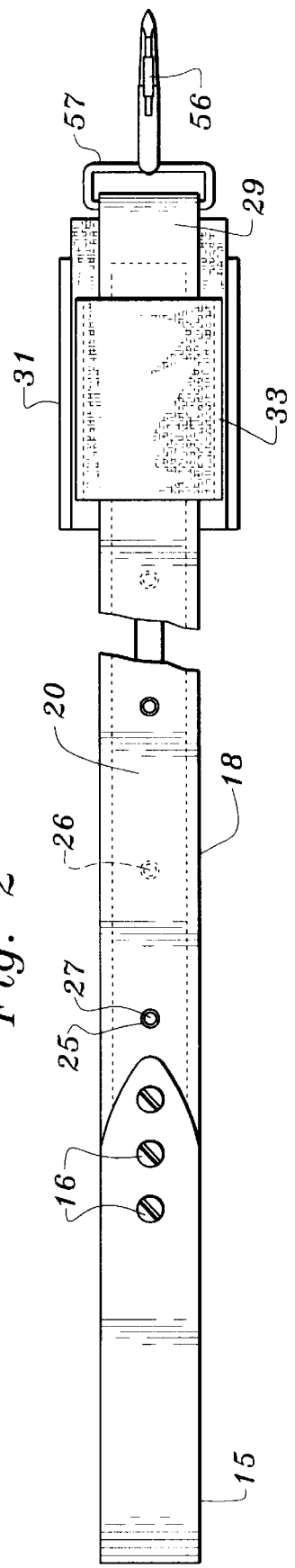

WATER RESISTANT LIGHTED LEASH AND COLLAR

FIELD OF THE INVENTION

This invention pertains to a water resistant lighted leash and a water resistant lighted collar, each of which can be used separately or the pair can be used together.

BACKGROUND OF THE INVENTION

Lighted leashes and collars for animals have been known for at least a decade. Recent technology advancements in micro-circuitry along with the development of light emitting diodes have enabled devices of this nature to be created. Thus a patent search by the applicant has turned up the following U.S. Patents:

| Hayden | 4,887,552 | December 19, 1992 |
| Pennock et al | 5,140,946 | August 25, 1992 |
| Heyman et al | 5,046,456 | September 10, 1991 |
| Kuhnsman et al | 4,513,692 | April 30, 1985 |
| Chao et al | 4,173,201 | November 6, 1979 |

While each of these patents pertains to a lighted or illuminatable dog leash or collar, none of them employ the construction mode of this invention, that permits the dog, cat or other tethered animal, while wearing the lighted collar/leash to be walked in the rain or snow, run through a puddle or wade in the river, and still be seen in the night darkness.

It is an object therefore of this invention to provide an illuminated dog, cat or other tethered animal leash/collar that is water resistant.

It is another object to provide a lighted animal leash/collar that has at least two different colors of lights thereon.

It is a third object to provide an animal collar that permits a night viewer to know the location of the top of the animal.

It is a fourth object to provide a dog or cat leash and collar that employ a series of blinking lights to call attention to the animal's presence.

It is an additional object to provide a lighted collar and leash system that turns on automatically as dusk approaches.

It is a further object to provide an animal leash and an animal collar that are manufactured using the same techniques.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is an elevational view, not to scale of the lighted animal leash of this invention.

FIG. 2 is a top plan view thereof.

FIG. 3 is a bottom plan thereof.

SUMMARY OF THE INVENTION

Figure 4:
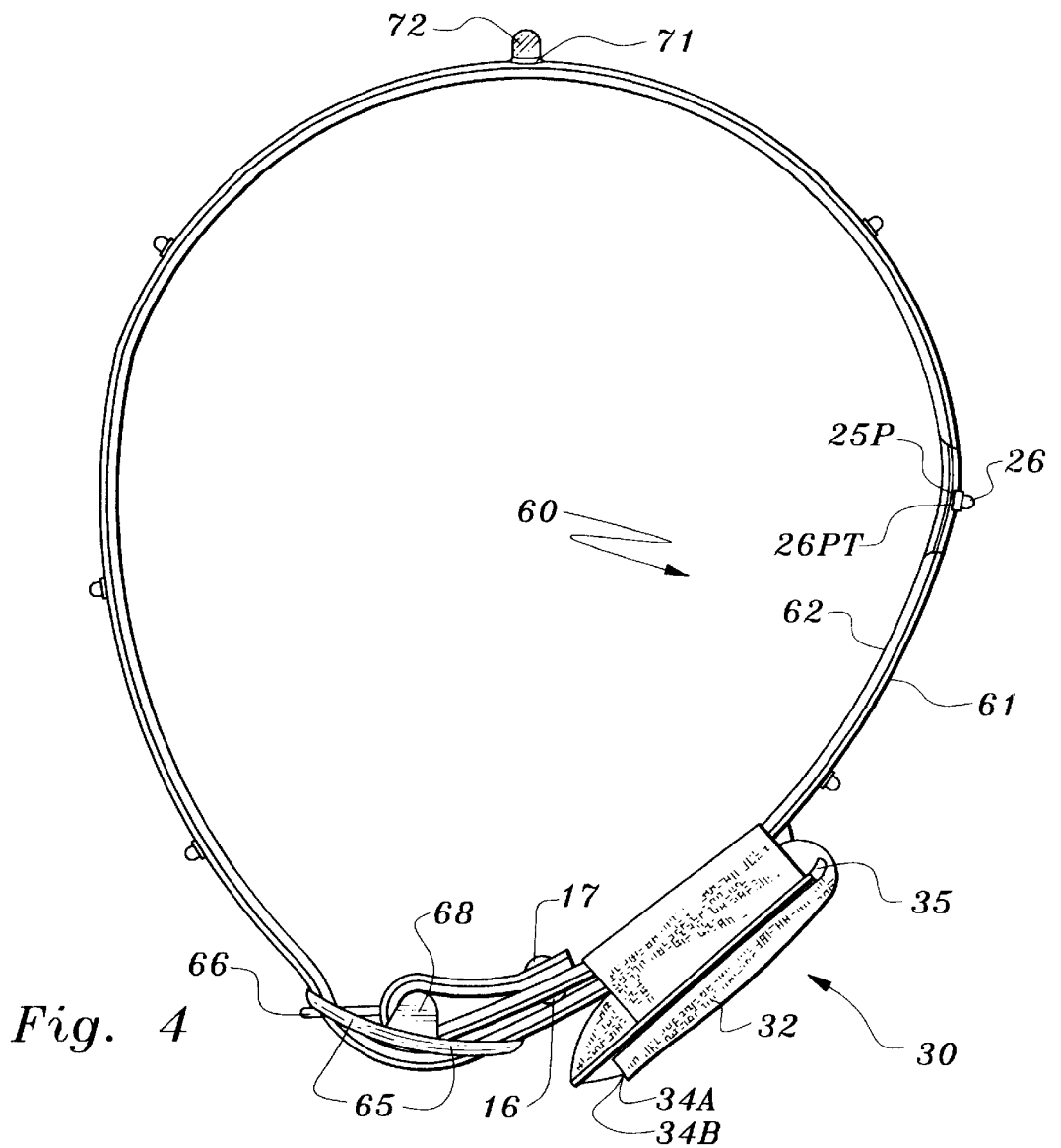
FIG. 4 is a left side elevational view, partly in cutaway, of a lighted collar according to this invention. A right side view is a mirror image thereof.

The invention relates to a water resistant mode of constructing a lighted animal leash and collar, which collar indicates the location of the top of the dog. Each device employs a series of lights of at least two colors, which can be made to shine constantly or blink on and off as may be desired.

DESCRIPTION OF THE PREFERRED EMBODIMENT

In FIG. 1 there is shown the dog leash aspect of this invention. Leash 10 has a grip portion 11, a body portion 18, and an attachment portion 12. The grip portion 11 comprises a grip handle 15, formed preferably of leather or synthetic leather, which is bolted or otherwise secured as by a series of bolts 16 disposed through suitable apertures, 14, in the body portion 18 to an aligned series of nuts such as cap nuts 17.

The body portion 18, is formed of two halves or substrates, 19 and 20 of an elongated single piece of leather or synthetic leather. The length can be set from about 3 to about 5 feet as may be desired from the terminator end 29 to the proximal end 21 of the body portion. Disposed at spaced intervals at suitably defined locations along the main body portion 18 are a series of diode holders, 25. These holders 25, which are annular, may include prongs on the underside thereof for better gripping into the leather substrate, when pressure is applied. Conventional holders 25 may also be cemented into position at the various locations along the main body 18. A bore 24 communicates from each holder through one layer of the two present in the main body to the interior of the main body. See FIG. 7. Green diodes 26, and red diodes 27 are disposed through the holders 25, while the leads thereof, per FIG. 8, pass inwardly through the bores 24 for connection, either directly or indirectly,(as will be described infra) to the circuitry of the device. The electrical hookup and the mode of doing so will also be described infra.

A battery pack 30, such as is available from Radio Shack, and its contents are carried by the two folded over substrates, 19 and 20 sewn together, as evidenced by stitching line 28 per FIG. 2, to form the main body portion 18. The battery pack, features a pouch 31, open on one end, the opening being covered over by flap 32. The flap 32 bears a section of either male or female Velcro™ or equal hook and loop enclosure that mates to a corresponding opposite gender section of such closure. An elastic retainer loop 33 on the underside of the battery pack 30, permits it to be slid into position on the leash 10's main body. A pair of wires 46 pass through the retainer into the interior of the main body portion, the use of which will also be described infra.

Terminal end 29 is a folded over section of the main body 18 with an eye or space 35 left therein. This eye 35 is formed when one end of the main body 18 is passed through the retainer 57 and some slack is maintained. Retainer 57 can be integral to, or attached to the eye bolt 55, which bolt 55 possesses a sliding bolt section 56, of a conventional design.

In FIG. 2, all of the elements previously described with respect to FIG. 1 are seen. In addition the stitching 28 which is used to join the two halves 19,20 of the main body portion is seen. However, in FIG. 3 the wiring 46 is not visible due to the change in vantage point.

Figure 7:
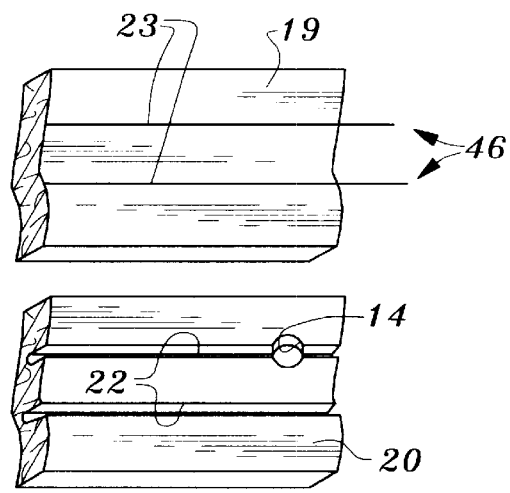
FIG. 7 is an internal planar view of the body portion of the leash of this invention.
Figure 8:
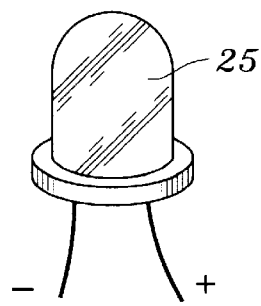
FIG. 8 is an elevational view of a diode used in this invention.

The reader is now referred to FIG. 7. Here the two sections of the main body portion 18 are seen. Section 20 is shown with a pair of parallel recesses 22 which are adapted to receive the pair of spaced insulated wires 23 resting on portion 19. A bore 14, adapted to received the pigtail of a diode is shown in line with the recesses. The wires 46 which emanate from the battery holder are seen to be aligned for connection to insulated wires 23 disposed within the main body portion.

The reader is now referred to FIG. 4, wherein the animal collar aspect of this invention is shown. This collar 60 is constructed in generally the same manner as the leash. That is, two members, an outer member 61 and an inner member 62 secured together by stitching 64 per FIG. 6. Whereas in the leash, one continuous member was bent over with an eye formed therein, here, two independent members are preferred. This is due to the fact that the preferred heavy stiff leather material used for the body of the leash and the collar does not readily form a tight bend as is required by the nature of the construction of a leash for the attachment of the buckle. Thus upper member 61 is extended approximately 1 inch, and folded around the tongue bar 68, and attached to the lower member 62 by a pair of nuts and bolts 16, 17 which are disposed through suitable unnumbered bores in the two members. A similar battery pack 30 with an open end 35 is covered over by a flap 32. Flap 32 carries a layer of VELCRO™ 34A, as does the body of the battery pack, where the VELCRO™ layer is designated 34B.

A series of lights, also as seen in FIG. 4, are disposed only around the upper surface 61 of the collar. Each light emitting diode used as the light source may be the same or different color, preferably selected from red, green, amber, and an alternating mixture thereof.

In the cutaway section of this drawing, a diode holder 25, having a prong 25P that sticks into the substrate 61, is seen. Disposed within the holder 25 is a green diode 26, but it could be a red diode 27 if desired. The diode has a pair of leads known as pigtails designated 26PT which are electrically connected to the wires 23. At the very middle of the collar 60, situated such that it is located above the neck of the animal when the collar is worn there is preferably found a larger diode holder 71 having a larger diode 72. Such an oversize diode is available from RADIO SHACK™ stores. While it may appear to be water white, when activated such light glows bright red and serves as a super bright red beacon light for the animal wearer. I have specifically chosen to put the larger white appearing—bright red light diode on the top of the animal, as this serves as an attention grabber of both drivers and pedestrians. The colored lights, from the diodes, be they constant or flashing, serve as a warning to these same people to exercise caution.

While I have indicated that I use light emitting diodes, (LEDs) as my light source, it is seen that the use of peanut bulbs such as are utilized for Christmas tree lights could be employed but are not recommended due to the use of glass envelopes for the lights. If such were surrounded by a clear plastic barrier, or other means to inhibit breakage upon impact, these too could be employed in this invention. Any other suitable low voltage light source may also be employed.

Figure 5:
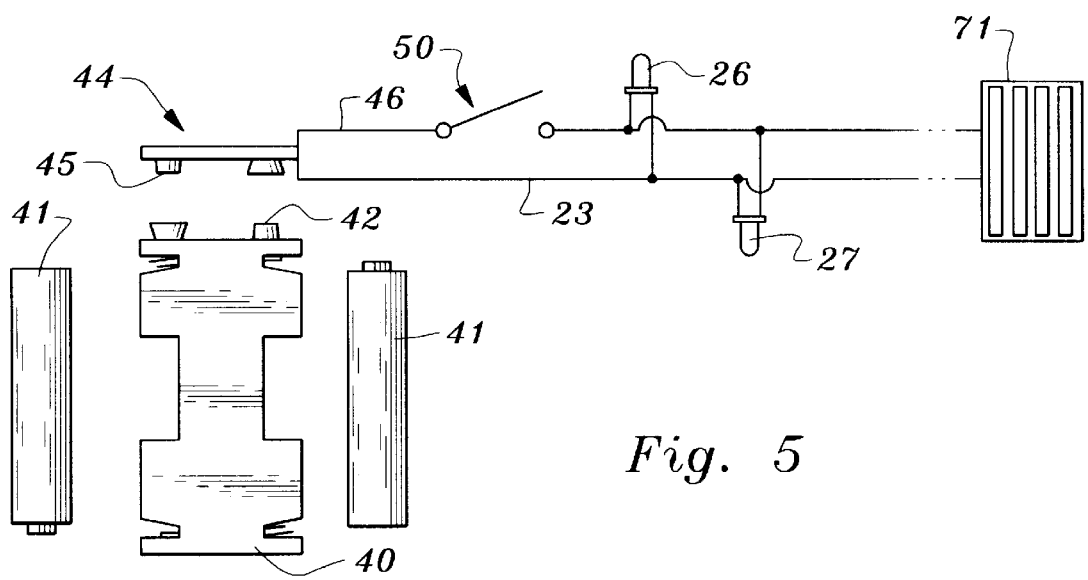
FIG. 5 is a diagrammatic view of the electrical circuitry used for both the leash and collar of this invention.

FIG. 5 illustrates the electrical circuitry involved in the lighted collar and lighted dog leash of this invention. The wires 23, which are disposed within the recesses of the main body portion as described supra are connected at one end to the wiring 46 which emanates from the battery pack. Wires 23 include a in-line switch 50 which can be manually actuated upon demand. One each of diodes 26 and 27 are shown connected by their respective here unnumbered pigtails to the wires 23 in a parallel circuit. A solar sensor 71 can be also placed in the circuit, such that if the manual switch 50 is engaged, or omitted, the lights will turn on automatically when the ambient light is dimmed.

Wiring 46 is connected at its other end to a conventional contact set 44 having a pair of electrical contacts 45, which are electrically engageable with a battery holder 40's contacts 42. A pair of AA batteries fit by press fit into the battery holder 40 which in turn is disposed within the battery pack 30. For collars for small dogs such a beagle or schnauzer a 3 volt camera battery can be used in an appropriately sized battery holder for disposition with a battery pack. All of these components are readily available from Radio Shack and other electronics supply stores.

Figure 6:
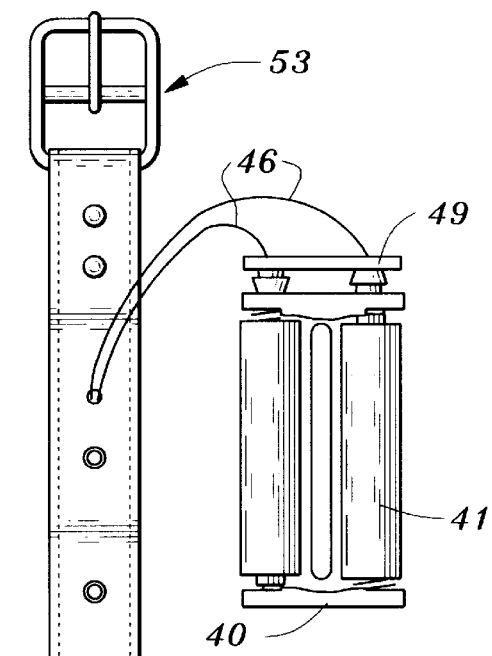
FIG. 6 is a diagrammatic top plan view of circuitry utilizable with the animal collar of this invention.

FIG. 6 demonstrates the mode of lighting as specifically utilized for a dog collar according to this invention. Further discussion is not needed, as like numbers refer to like parts connected in the same manner. A series of apertures 73 for interconnection with the tongue 66 of the buckle are seen in this top plan view, as is the stitching 46 which keeps the moisture out of the interior of the device. The preferred jumbo LED 72 of having a super bright red light is seen to be in the generally middle area of the length of the collar.

Figure 9:
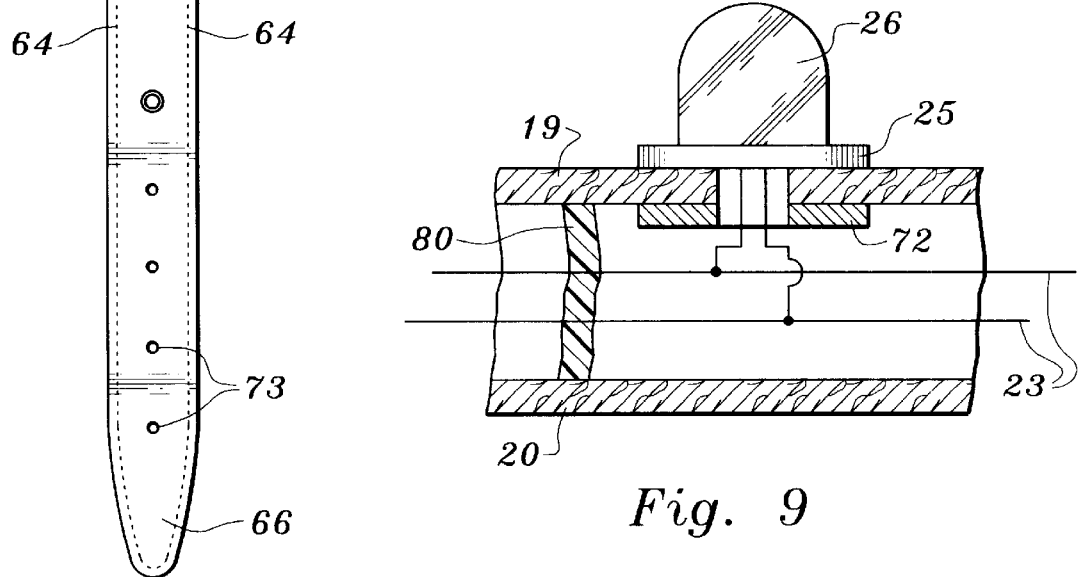
FIG. 9 is a diagrammatic elevational view showing the preferred mounting of the diodes within the confines of the collar/leash of this invention.

While FIG. 9 shows the direct attachment of the pigtails of the diodes to the wiring 23, it has been found that it is more beneficial to mount the diodes indirectly to the wiring. Thus reference is made to FIG. 9. Here, a diode such as green diode 26 is shown mounted to a small conventional circuit board such as is readily available at any electronic parts store or home hardware super store.

While a series of lights is employed, the exact distance between each member of the series may vary with the length of the leash or collar, as well as by the desire of the creator of the device on constant length devices.

While the figures show separate recesses for each of the two members of wiring, the positive lead and the negative lead, within the leather or other substrate, it is within the scope of the invention to employ but a single recess for both leads of wire.

As to the leather segments, I prefer to use, leather that is at least ⅛th inch thick to ensure the water resistance of the circuitry. The term leather as used herein encompasses both real and artificial leather including the products made from polyurethane and vinyl polymers.

In order to increase the water resistance of the circuitry within the confines of the substrates, a layer of sealant such as epoxy 80 may be, per FIG. 9, may be placed along the edges of the collar or leash. In addition, plastic tubing known as spaghetti can be used around all junctions of wiring to the pigtails of the diodes.

While the invention includes a series of lamps, diodes are the preferred light source, and peanut bulbs are deemed less desirable lamps, as they are less reliable for various reasons. It is of course understood by those skilled I the art that peanut bulbs must of course include pigtail wiring, or be disposed within a socket that includes wiring for connection to the wires that run along the recess(es) of the leather.

While the discussion has talked of two pieces of leather secured interior surface to interior surface, it is also to be seen that a single piece of leather as previously defined can be folded over upon itself to achieve a similar effect and result. Such a construction especially lends itself to the leash aspect of this invention.

It has been found that by constructing the leash and the collar in the manner previously described that a dog or cat can run through puddles, or swim in a river and still the lights of the leash and/or collar can be actuated upon demand.

Since certain changes may be made in the above described apparatus without departing from the scope of the invention herein involved, it is intended that all matter contained in the above description and in the accompanying drawings, if present, shall be interpreted as illustrative only and not in a limiting sense.

I claim:

1. A lighted, when actuated, animal control device, selected from the group consisting of a leash and a collar, which device comprises:
   A. two pieces of elongated leather, each having a first end and a second end, each piece also having an interior surface and an exterior surface, one of which pieces has at least one elongated recess on the interior surface thereof, which at least one recess is adapted to receive wires therein, said two pieces being secured to each other, with their interior surfaces facing each other;
   B. a pair of wires disposed within the at least one recess,
   C. a plurality of spaced lamp holders disposed along the length of at least one of said pieces of leather,
   D. a plurality of lamps, one of which is disposed in each lamp holder,
   E. wiring from each of said lamps disposed through its respective holder and through one of said pieces, said wiring being electrically connected to said pair of wires,
   F. a battery pack disposed upon said device and electrically connected to said pair of wires,
   G. and connection means upon said device for connecting said device to an animal.

2. The device of claim 1 and said device is designated a leash.

3. The device of claim 1 wherein the connection means upon said device comprises a buckle on said device and said device is designated a collar.

4. The device of claim 1 wherein the two pieces of leather are secured to each other in an elongated aligned relationship.

5. The device of claim 1 further including a sealant layer along the edges of the two pieces of leather secured together.

6. The device of claim 1 wherein the plurality of lamps are light emitting diodes.

7. The device of claim 6 wherein the light emitting diodes are of a plurality of colors.

8. The device of claim 6 wherein one of the light emitting diodes is of a larger physical size than the balance of the diodes.

9. The device of claim 8 wherein the device is a collar and said larger diode is disposed on the device such that when buckle of the collar is disposed beneath the neck of the animal, the larger diode is on the top of the neck of the animal.

10. The device of claim 1 wherein lamps are disposed on the exterior side of both pieces of leather.

11. The device of claim 10 wherein the lamps are light emitting diodes.

12. The device of claim 11 wherein the diodes are of least two different colors.

13. The device of claim 1 wherein the battery pack includes a battery holder, and batteries and a retaining cover.

14. The device of claim 1 further including means to electrically switch the lamps on and off.

15. The device of claim 14, wherein the means to switch the the lamps on and off is a solar sensor.

16. The device of claim 15 wherein the lamps are of more than one color.

17. A lighted animal collar comprising:
    A. two pieces of elongated leather, each having a first end and a second end, each piece also having an interior surface and an exterior surface, one of which pieces has at least one elongated recess on the interior surface thereof, which at least one recess is adapted to receive wires therein, said two pieces being secured to each other, with their interior surfaces facing each other;
    B. a pair of wires disposed within the at least one recess,
    C. a plurality of spaced lamp holders disposed along the length of the exterior surface of both of said pieces of leather,
    D. a plurality of light emitting diodes, one of which is disposed in each lamp holder,
    E. wiring from each of said lamps disposed through its respective holder and through one of said pieces, said wiring being electrically connected to said pair of wires,
    F. a battery pack disposed upon said device and electrically connected to said pair of wires,
    G. and connection means upon said device for connecting said device to an animal wherein the connection means comprises a buckle;
    H. a switching means electrically connected to said wires to switch the diodes on and off; and wherein one of the light emitting diodes is of a larger physical size than the balance of the diodes;
    and one of said diodes is a larger diode and is disposed on the device such that when the buckle of the collar is disposed beneath the neck of the animal, the larger diode is on the top of the neck of the animal.

* * * * *